March 31, 1942.  P. H. THOMPSON  2,278,004
PRESSURE REGULATING VALVE
Filed June 23, 1939    2 Sheets-Sheet 1
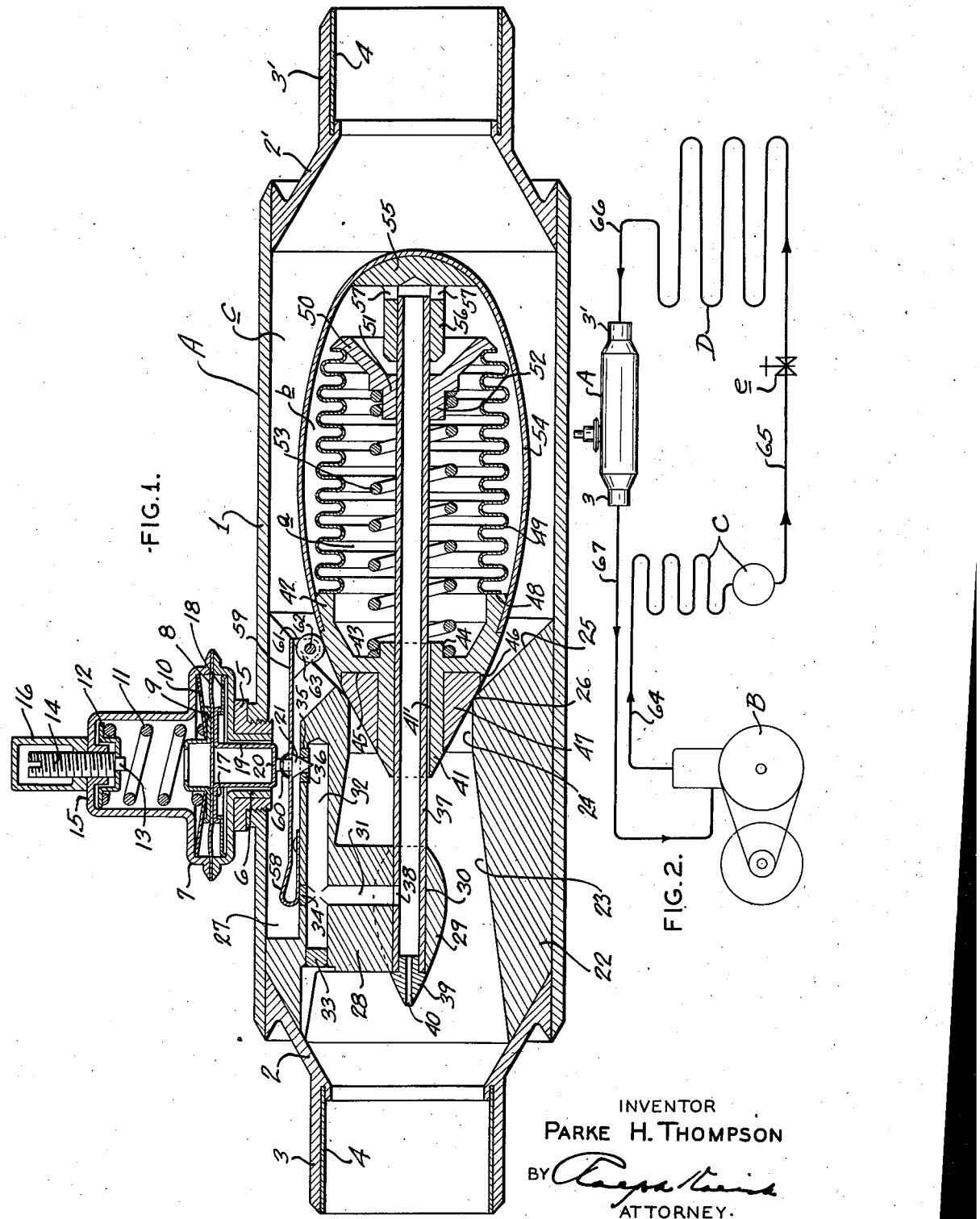
INVENTOR
PARKE H. THOMPSON
BY
ATTORNEY.

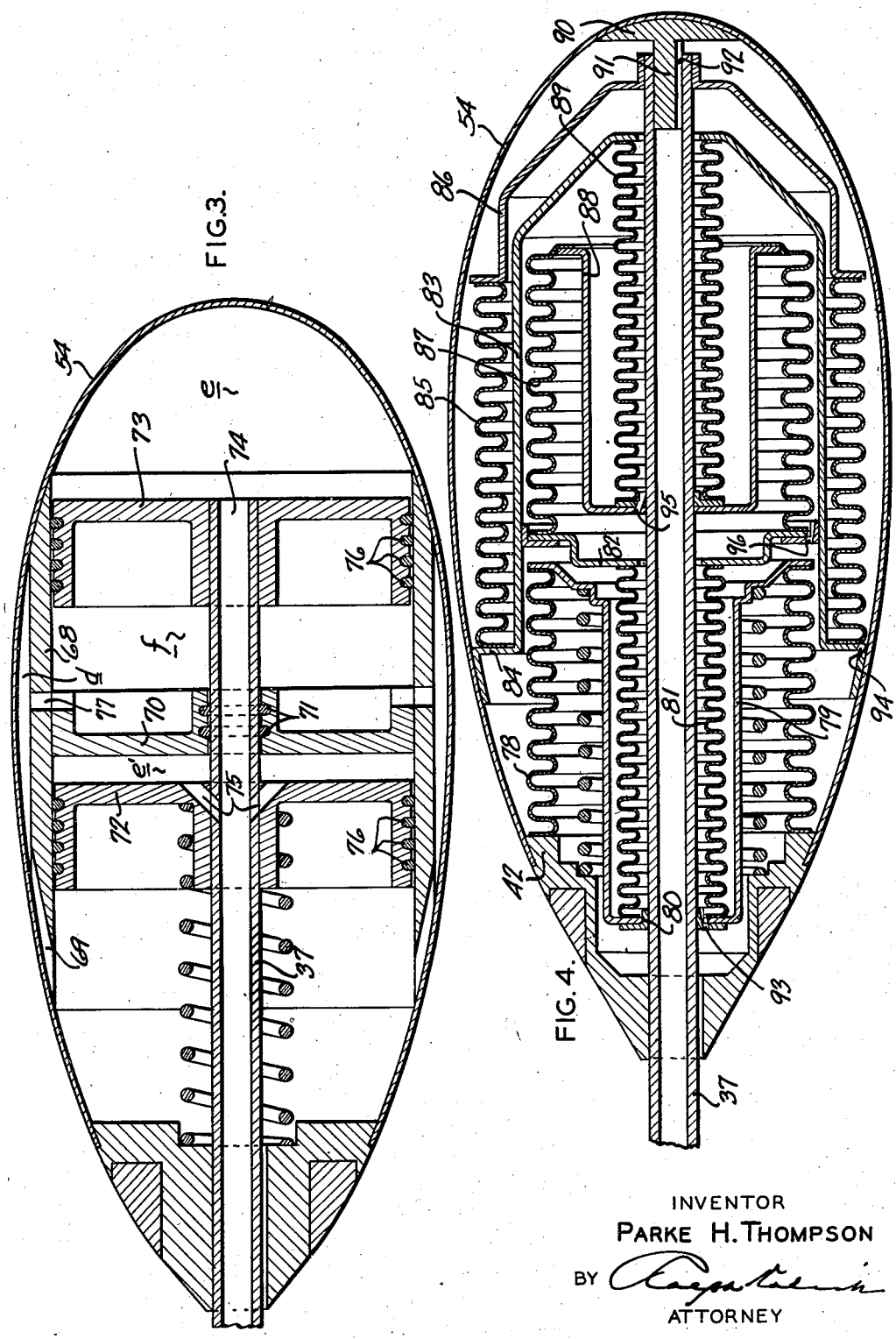

Patented Mar. 31, 1942

2,278,004

UNITED STATES PATENT OFFICE 2,278,004

PRESSURE REGULATING VALVE

Parke H. Thompson, Millville, N. J.

Application June 23, 1939, Serial No. 280,722

14 Claims. (Cl. 50—14)

This invention relates to a certain new and useful improvement in pressure regulating valves and has for its primary objects the provision of a valve of the type stated which is compact in size and simple and economical in structure, which comprises a uniquely streamlined valve-closing member and seat having an exceedingly high flow factor, which is uniquely controlled by pilot valve mechanism, which is automatically self-compensating against over-travel, thereby preventing cycling or so-called wild hunting, which is extremely sensitive to small variations in pressure, which is precise and positive in operation, maintaining an extremely accurate regulatory control, and which is highly efficient in the performance of its intended functions.

And with the above and other objects in view, my invention resides in the novel features of form, construction, arrangement, and combination of parts presently described and pointed out in the claims.

In the accompanying drawings (2 sheets)—

Figure 1 is a longitudinal sectional view of a back-pressure regulating valve constructed in accordance with and embodying my present invention;

Figure 2 is a diagrammatic view, illustrating the incorporation of the valve in a refrigerating system; and Figures 3 and 4 are longitudinal sectional views of modified forms of valve structures embodying my present invention.

Referring now in more detail and by reference characters to the drawings, which illustrate practical embodiments of my present invention, the back-pressure valve, generally designated A, includes an elongated preferably metallic tubular shell I provided across its opposite ends with hermetically sealed frusto-conical walls 2, 2', each having a preferably integral co-axial tubular extension or sleeve 3, 3', respectively, each suitably, in turn, provided with an interliner 4 for hard-soldered or welded connection to suitable pipe lines by which the valve A may be connected in the system to be controlled. It will, of course, be obvious that conventional flanges or other types of couplings may be employed in case it is not desirable or convenient to use soldered or welded connections.

Intermediate its ends, the shell I is pierced and threadedly equipped with an annular inset collar or coupling 5 for hermetically sealed engagement with the outwardly projecting tubular extension 6 of a pilot valve housing 7.

Peripherally secured within, and extending diametrally across, the housing 7, is a diaphragm 8, upon the external face of which an outer pressure-plate 9 is held concentrically by a disk-like positioning ring 10 and biased by a compression spring 11 abuttingly seated at its outer end within a dished spring retaining washer 12 rotatively mounted on the pin-like projecting end 13 of an adjustment screw 14 threadedly mounted in, and projecting through, the outer end wall 15 of the housing 7 and provided on its outer end with a cap nut 16, all as best seen in Figure 1 and for purposes presently fully appearing.

Centrally of its inner face, the diaphragm 8 is provided with an inner pressure plate 17 positioned and counter-biased by an annular spring 18 and provided with a preferably integral tubular extension 19 projecting axially inwardly through, and being preferably of rectangular cross-section and having a diagonal dimension substantially equal to the diametral size of, the housing sleeve 6, the extension 19 having a transverse end wall 20 for abutting engagement with an axially projecting valve pin 21, also as best seen in Figure 1 and for purposes presently appearing.

Welded or otherwise rigidly secured upon the inner face of the end wall 2 and the adjacent portion of the inner face of the shell I, is a tubular insert member 22 axially bored or machined in the provision of an inwardly converging Venturi diffuser 23 tapering into a more or less straight sided constriction or throat 24 and at its inner end being flared sharply outwardly, as at 25, in the provision of a valve seat 26. The insert member 22 is further provided in its outer face with an axially extending slot 27 opening at one end upon the oblique face 25 and terminating a short distance from the wall engaging end of the insert member 22, all as best seen in Figure 1 and for purposes presently fully appearing.

Formed preferably integrally with the insert member 22 and extending radially inwardly partially across the Venturi diffuser 23, is a substantially rigid supporting boss 28 provided at its outer end with a somewhat egg-shaped or streamlined enlargement 29 provided with a bore 30 in co-axial alignment with the constriction 24. The boss 28 and the body of the insert 22 are provided with intersecting drill holes 31, 32, conventionally plugged, as at 33, 34, for the provision of closed passages. At its inner end, the drill hole 32 is provided in its outer side wall with an aperture 35 for receiving an annular pilot valve seat 36 positioned for seating co-operation with the pointed end of the valve pin 21.

Welded or otherwise securely fixed in the bore 30 and extending inwardly through and projecting a substantial distance beyond the constriction 24, is a tubular stem 37 provided with an aperture 38 for communication with the drill hole 31 and having in its outer end a nozzle-shaped tip member 39 externally contoured as a continuation of the streamlining end enlargement 29 and provided with an axially extending relief bore 40 of relatively small diameter, all as best seen in Figure 1 and for purposes presently fully appearing.

Shiftably mounted on the stem 37, is a seat-supporting sleeve 41 having a longitudinal vent slot 41' opening on the downstream side of the Venturi throat 24. The sleeve 41 is positioned for extension through and beyond the constriction 24 and is provided at its projecting end with an annular cup-like collar 42 having an end wall 43 provided with an outwardly projecting annular shoulder 44 and an opposed end face 45 provided with a short retention flange 46 for engagement with an annular valve plug 47 sized for valve closing co-operating with the valve seat 26, the exposed faces of the sleeve 41, the valve plug 47, and the collar 42 being of somewhat paraboloidal or streamlined shape, all as best seen in Figure 1 and for purposes presently fully appearing.

Welded or otherwise hermetically secured upon the inwardly presented transverse face 48 of the collar 42, is a cylindrical bellows or Sylphon 49 provided at its other end with an inwardly depressed frusto-conical end washer 50 having a hub-portion 51 securely welded to the tubular stem 37 a substantial distance inwardly from the outer end thereof, the hub 51 being diametrally reduced along its outer face, as at 52, for retentively engaging one end of a compression spring 53, in turn, at its other end seatingly disposed around the shoulder 44 of the collar 42 in the formation of an inner expansible chamber a.

Marginally welded or otherwise hermetically secured to, and suitably mortised in the outer face of, the collar 42, is a preferably metallic ovicapsular bulb 54, which has an outer contour in smoothly curved continuation of the streamlined shape of the collar 42 and valve plug 47, and which along its inner face is spaced substantially outwardly from the Sylphon 49, the interior of the valve A being thus divided into an enclosed expansion chamber b and an intake chamber c.

The bulb 54 extends substantially beyond the end of the stem 37 and is provided with a transversely extending end casting 55 having a centrally disposed tubular guide sleeve 56 internally sized for snug-fitting slidable engagement over the end of the stem 37 and having a pair of diametrally opposed radial apertures 57 providing communication between the chamber b and the interior of the valve stem 37.

Riveted or otherwise fixed upon the bottom face of the slot 27, is a hairpin spring 58 having a flat spring-leaf 59 embracingly disposed around the pilot valve pin 21 and resiliently secured thereto by a dished spring washer 60. At its free end, the spring leaf 59 is provided with a pair of spaced parallel inwardly projecting ears 61 having a transversely extending pin 62 for rotatively supporting a roller 63 slidably engaging the outwardly presented paraboloidal surface of the collar 42, all as best seen in Figure 1 and for purposes presently fully appearing.

It will be understood that control valves constructed in accordance with and embodying my present invention may be efficiently employed in a variety of installations; for purposes of illustration, I have chosen to describe its use and operation in connection with a conventional type of refrigeration system including a compressor B, a liquid condenser-receiver C, and an evaporator D. The compressor outlet is conventionally connected through a line 64 to the condenser-receiver C, which is, in turn, connected through a line 65 and a conventional expansion valve e to the evaporator D. The discharge or outlet end of the evaporator D is connected through a discharge line 66 to the sleeve 3' for communication with the chamber c of the valve A, which is, in turn, at its other sleeve 3 connected through a return or suction line 67 to the intake side of the compressor B.

When the system is first set into operation, the pressure in the evaporator is relatively low. Accordingly, the pressure in the chambers c and b will also be relatively low. Under such circumstances, the valve plug 47 will be shifted along the valve stem 37 into seated or closed engagement with the valve seat 26. As the temperature and pressure in the evaporator rise, the diaphragm 8 will be displaced outwardly against the opposing force of the spring 11, allowing the pilot valve pin 21 to shift out of seated engagement with the valve seat 36. Thereupon expanded refrigerant gas will flow through the drill holes or passages 32, 31, and through the valve stem 37 into the chamber b, setting up a substantial pressure therein, which forces the bulb 54 outwardly, partially compressing or telescoping the Sylphon 49 and shifting the valve plug 47 out of seated engagement, allowing the high-pressure refrigerant gas to flow around the streamlined bulb 54 past the valve seat 26, through the constriction 24 and diffuser 23 to the suction line 67.

The balance of high-pressure gaseous refrigerant supplied to the chamber b through the pilot valve seat 36 is maintained by leakage through the relief bore 40 in the outer end of the tubular valve stem 37. As has been above pointed out, the relief bore 40 is disposed in the end of the streamlined enlargement 29 and is positioned within the Venturi diffuser 23, thereby making the mechanism extremely sensitive to slight variations in pressure and velocity. It will also be evident that opposed against the force of the spring 11, which tends to urge the diaphragm 8 downwardly and shift the pilot valve pin 21 into closed or seated position in the valve seat 36, there are the forces of the counter-balancing spring 18, the tension of the spring leaf 59, and the pressure within the chamber c. When the bulb 54 is shifted away from the valve seat 26, the roller 63 will ride downwardly, reducing the amount of tension-producing deflection of the spring leaf 59, the effect of which is the same as a reduction in pressure within the chamber c, thereby permitting the pilot valve pin 21 to shift toward closed position, restricting or entirely cutting off the flow of high-pressure gaseous refrigerant into the chamber b and thereby decelerating, arresting, or, in extreme cases, even reversing the opening movement of the valve plug 47 so as to anticipate and prevent over-travel.

It will be seen, therefore, that the action of the leaf spring 59 responsive to valve opening movement of the bulb 54 automatically compensates for over-travel of the valve seat 47 and anticipates the change in the evaporator produced by the throttling action within the valve A, thus substantially preventing cycling or so-called wild hunting.

By reason of the streamlined shape of the bulb 54 and the associated valve plug 47, taken in conjunction with the discharge or flow of high-pressure gas from the chamber c into the return or suction line 67 through the Venturi constriction 24 and diffuser 23, the flow factor is materially increased with resultant increases in efficiency and volumetric capacity for any given orifice size.

If desired, the bulb 54 may be provided with an open-ended cylindrical innerliner 68 spaced inwardly from the inner face of the bulb 54 in the provision of an annular chamber d communicating through the slot 69 formed in the innerliner 68 with the low-pressure side of the valve. Welded or otherwise secured around its periphery upon the inner face of the innerliner 68 and extending diametrally thereacross, is a piston-like partition 70 slidably mounted on the stem 37 and sealed by a plurality of packing rings or other suitable sealing means 71.

Rigidly fixed to the stem 37 on opposite sides of the partition 70, are pistons 72, 73, forming intermediate chambers e, e', respectively communicating through the open end 74 of the stem 37 and the oblique passages 75 extending through the piston 72. The pistons 72, 73, are likewise shiftably sealed within the liner 68 by means of packing rings or other suitable sealing means 76. Enclosed between the partition 70 and the piston 73, is an auxiliary space f in communication through the passage 77, the annular chamber d, and the passage 69, all as best seen in Figure 3. I have found that the tandem piston construction enables the impression of higher differential pressures upon the valve A without materially increasing its size.

I have also found that the capacity of the valve A may be enlarged for greater pressure differentials and rates of flow by interiorly providing the bulb 54 with a plurality of cumulative Sylphons, including a Sylphon 78 rigidly mounted upon the collar 42 and welded at its other end to the stationary shell 79 secured, as at 80, to the stem 37. Interiorly the shell 79 is provided with an auxiliary or sealing Sylphon 81, which is, at its outer end, welded to a movable wall 82 secured annularly within an auxiliary shell 83, in turn, provided with an outwardly extending annular flange 84 welded or otherwise rigidly secured to the bulb 54. Welded or otherwise secured at its one end upon the flange 84, is another auxiliary Sylphon 85 welded at its other end to an auxiliary fixed wall member 86 mounted rigidly on the end of the stem 37. Similarly welded at its one end upon the wall 82, is another auxiliary Sylphon 87, in turn, welded at its other end to an auxiliary fixed shell 88 fixed upon the stem 37 and being interiorly provided with a last auxiliary or sealing Sylphon 89 extending co-axially outwardly therefrom and being welded at its outer end to the inner peripheral margin of the auxiliary wall member 83.

Welded in the curved end wall of the bulb 54, is a circular casting 90 having an integrally formed pin 91 sized for snug-fitting slidable disposition within the end of the stem 37 and being provided with an axial slot 92 in the provision of a passage from the interior of the stem 37 to the exterior of the Sylphon 85. The shells 79, 83, 88, and the wall 82 are respectively provided with apertures 93, 94, 95, and 96 for respectively interconnecting the interiors of the Sylphons 78, 81, and 89, and the exteriors of the Sylphons 78, 85, and 87, all as best seen in Figure 4. It will, of course, be evident that the arrangement of multiple Sylphons above described in effect permits greater over-all area without materially increasing the diameter of the bulb 54, thereby increasing the available valve-actuating force.

It should be understood that changes and modifications in the form, construction, arrangement, and combination of the several parts of the valve may be made and substituted for those herein shown and described without departing from the nature and principle of my invention.

Having thus described my invention, what I claim and desire to secure by Letters Patent is—

1. In a pressure regulating valve, a valve body having inlet and outlet compartments, passage forming means connecting the two compartments, an ovicapsular member having a valve plug co-operable with the passage forming means for controlling the flow from the inlet to the outlet compartments, cylinder forming means mounted in the ovicapsular member, and a plurality of tandem connected fixed pistons operatively mounted in the cylinder forming means for causing said member and the associated valve plug to shift responsive to changes in the pressure within the inlet compartment.

2. A back-pressure valve comprising a valve body having inlet and outlet compartments, passage forming means connecting the two compartments, a valve plug co-operable with the passage forming means for controlling the flow from the inlet to the outlet compartments, and means including a plurality of tandem connected pistons responsive to the pressure in the inlet compartment for actuating the valve plug.

3. A back-pressure valve comprising a valve body having inlet and outlet compartments, passage forming means connecting the two compartments, a valve plug co-operable with the passage forming means for controlling the flow from the inlet to the outlet compartments, and means including a plurality of interacting bellows responsive to the pressure in the inlet compartment for actuating the valve plug.

4. In a pressure regulating valve, a valve body having inlet and outlet compartments, passage forming means connecting the two compartments, an ovicapsular member having a valve plug co-operable with the passage forming means for controlling the flow from the inlet to the outlet compartments, and a plurality of interacting bellows operatively mounted in the ovicapsular member for causing said member and the associated valve plug to shift responsive to changes in the pressure within the inlet compartment.

5. A pressure regulating valve comprising a tubular shell, inlet and outlet connection sleeves mounted in the opposite ends of the shell, a tubular insert member mounted co-axially within the shell and internally contoured in the provision of a venturi constriction, a boss upon the insert member projecting radially into the diffuser of the venturi constriction, a tubular valve stem rigidly mounted in the boss and extending axially through the venturi constriction, a valve plug shiftably mounted on the stem, and means fixed upon the stem for actuating the valve plug.

6. A pressure regulating valve comprising a tubular shell, inlet and outlet connection sleeves mounted in the opposite ends of the shell, a tubular insert member mounted co-axially within the shell and internally contoured in the provision of a venturi constriction, a boss upon the insert member projecting radially into the diffuser of the venturi constriction, a tubular valve stem rigidly mounted in the boss and extending axially through the venturi constriction, a valve plug shiftably mounted on the stem, and pressure actuable means mounted on the stem and operatively connected to the valve plug for shifting the valve plug into and out of seated engagement in the venturi constriction.

7. A pressure regulating valve comprising a tubular shell, inlet and outlet connection sleeves mounted in the opposite ends of the shell, a tubular insert member mounted co-axially within the shell and internally contoured in the provision of a venturi constriction, a boss upon the insert member projecting radially into the diffuser of the venturi constriction, a tubular valve stem rigidly mounted in the boss and extending axially through the venturi constriction, a valve plug shiftably mounted on the stem, pressure actuable means mounted on the stem and operatively connected to the valve plug for shifting the valve plug into and out of seated engagement in the venturi constriction, and means for imposing pressure upon said pressure actuable means.

8. A pressure regulating valve comprising a tubular shell, inlet and outlet connection sleeves mounted in the opposite ends of the shell, a tubular insert member mounted co-axially within the shell and internally contoured in the provision of a venturi constriction, a boss upon the insert member projecting radially into the insert member, a tubular valve stem rigidly mounted in the boss and extending axially through the venturi constriction, a valve plug shiftably mounted on the stem, pressure actuable means mounted on the stem and operatively connected to the valve plug for shifting the valve plug into and out of seated engagement in the venturi constriction, said means being in communication with the interior of the tubular valve stem and said valve stem being connected to a source of relatively high-pressure fluid, and pilot valve means operatively associated with the valve stem for controlling the flow of high-pressure fluid to the pressure actuated means.

9. A pressure regulating valve comprising a tubular shell, inlet and outlet connection sleeves mounted in the opposite ends of the shell, a tubular insert member mounted co-axially within the shell and internally contoured in the provision of a Venturi constriction, a boss upon the insert member projecting radially into the constriction, a tubular valve stem rigidly mounted in the boss and extending axially through the Venturi constriction, a valve plug shiftably mounted on the stem, and a pressure actuated bellows mounted on the stem operatively connected to the valve plug for shifting the valve plug into and out of seated engagement in the Venturi constriction.

10. A pressure regulating valve comprising a tubular shell, inlet and outlet connection sleeves mounted in the opposite ends of the shell, a tubular insert member mounted co-axially within the shell and internally contoured in the provision of a Venturi constriction, a boss upon the insert member projecting radially into the diffuser of the Venturi constriction, a tubular valve stem rigidly mounted in the boss and extending axially through the Venturi constriction, a valve plug shiftably mounted on the stem, a pressure actuated bellows mounted on the stem and operatively connected to the valve plug for shifting the valve plug into and out of seated engagement in the Venturi constriction, the interior of said bellows being in communication with the interior of the tubular valve stem and said valve stem being connected to a source of relatively high-pressure fluid, and pilot valve means operatively associated with the valve stem for controlling the flow of high-pressure fluid to the pressure actuated bellows.

11. A pressure regulating valve comprising a tubular shell, inlet and outlet connection sleeves mounted in the opposite ends of the shell, a tubular insert member mounted co-axially within the shell and internally contoured in the provision of a Venturi constriction, a boss upon the insert member projecting radially into the diffuser of the Venturi constriction, a tubular valve stem rigidly mounted in the boss and extending axially through the Venturi constriction, a valve plug shiftably mounted on the stem, a pressure actuated bellows mounted on the stem and operatively connected to the valve plug for shifting the valve plug into and out of seated engagement in the Venturi constriction, and an ovicapsular bulb mounted on the valve plug and disposed enclosingly around the bellows and valve stem, presenting a streamlined envelope around that end of the valve which is presented toward the flow of incoming fluid.

12. A back-pressure valve comprising a valve body having inlet and outlet compartments, passage forming means connecting the two compartments, a tubular stem extending longitudinally through the passage, a capsular member disposed in the inlet compartment and shiftably mounted on the stem, a valve plug carried by the capsular member and being co-operable with the passage forming means for controlling the flow from the inlet to the outlet compartments, means mounted on the stem interiorly of, and for co-operation with, the capsular member in the provision of an expansible chamber, and means for admitting a controlled flow of fluid from the inlet chamber through the stem to the expansible chamber for shifting the capsular member and its associated valve plug responsive to variations in the pressure in the inlet compartment.

13. A back-pressure valve comprising a valve body having inlet and outlet compartments, passage forming means connecting the two compartments interiorly contoured to provide a constriction, a capsular member having a valve plug shiftable toward and away from the passage constriction for controlling the flow from the inlet to the outlet compartments, spring means enclosed within the capsular member for biasing said member toward said constriction, and means responsive to the pressure in the inlet compartment for shifting the valve plug away from the constriction against the bias of the spring means.

14. A pressure-regulating valve comprising a valve body having inlet and outlet compartments passage forming means connecting the two compartments, an ellipsoidal member shiftable into and out of the passage forming means for controlling the flow from the inlet to the outlet compartments, actuating means for shifting the ellipsoidal member, pilot valve means for controlling the actuating means responsive to variations in the pressure of the inlet compartment, and biasing means associated with the pilot valve means and actuated by the ellipsoidal member for modifying the control-response of said pilot valve means relative to the position of said ellipsoidal member.

PARKE H. THOMPSON.